United States Patent
Ham et al.

(10) Patent No.: US 7,938,898 B2
(45) Date of Patent: May 10, 2011

(54) INK COMPOSITION, INK CARTRIDGE INCLUDING THE INK COMPOSITION, AND INKJET RECORDING APPARATUS INCLUDING THE INK CARTRIDGE

(75) Inventors: Cheol Ham, Yongin-si (KR); Hyo-Keun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 12/260,458

(22) Filed: Oct. 29, 2008

(65) Prior Publication Data

US 2009/0288579 A1 Nov. 26, 2009

(30) Foreign Application Priority Data

May 23, 2008 (KR) .................. 10-2008-0048243

(51) Int. Cl.
*C09D 11/02* (2006.01)
(52) U.S. Cl. ............... 106/31.46; 106/31.43; 106/31.75; 106/31.76

(58) Field of Classification Search ............... 106/31.43, 106/31.46, 31.75, 31.76
See application file for complete search history.

(56) References Cited

U.S. PATENT DOCUMENTS

| 4,279,653 A | 7/1981 | Makishima et al. |
| 7,247,192 B2 * | 7/2007 | Ohira et al. ............... 106/31.27 |

FOREIGN PATENT DOCUMENTS

JP 52-74406 6/1977

* cited by examiner

*Primary Examiner* — Jerry Lorengo
*Assistant Examiner* — Veronica Faison Gee
(74) *Attorney, Agent, or Firm* — Staas & Halsey LLP

(57) ABSTRACT

Provided is an ink composition including a colorant; a solvent; a surfactant; and an oxygen absorber of a hetero ring compound and a hydroxylamine-based compound. The oxygen absorber lowers a concentration of oxygen dissolved in the ink composition and maintains a low level even when the ink composition is in a high-temperature condition. Thus, gas is substantially not generated and bubbles are not formed. The ink composition can be stably ejected during high-speed printing.

18 Claims, 2 Drawing Sheets

INK COMPOSITION, INK CARTRIDGE INCLUDING THE INK COMPOSITION, AND INKJET RECORDING APPARATUS INCLUDING THE INK CARTRIDGE

CROSS-REFERENCE TO RELATED PATENT APPLICATIONS

This application claims the benefit of Korean Patent Application No. 10-2008-0048243, filed on May 23, 2008, in the Korean Intellectual Property Office, the disclosure of which is incorporated by reference herein, in its entirety.

TECHNICAL FIELD

This disclosure relates to ink. In particular, it is an composition, an ink cartridge including the ink composition, and an inkjet recording apparatus including the ink cartridge.

BACKGROUND

Various types of ink for inkjet recording have been developed. These include ink prepared by dissolving dyes in an aqueous or non-aqueous medium, dispersing pigments in an aqueous or non-aqueous medium, and solid ink that is thermally dissolved. Ink prepared by dissolving dyes in an aqueous or non-aqueous medium is used because of its color forming ability and stability.

Inkjet printers are used in homes and offices. The quality of images formed by inkjet printing is generally high. To maintain a good inkjet recording performance over a long period of time, aqueous ink for inkjet recording should have the following characteristics. The viscosity, surface tension, and density of the ink should be at appropriate levels, the ink should not clog nozzle inlets of an inkjet recording apparatus when exposed to heat, the ink should not precipitate, and images formed with the ink should have water and light resistance properties.

One of the properties desired of aqueous ink is performance in high-speed printing. Methods of increasing the speed of printers have been focused on the printing head, rather than the ink. Stable ink ejection performance during a high frequency may be related to micro bubbles that are generated in the vicinity of a heater of a thermal head or at an end of a nozzle and attached to a side of the nozzle.

In addition, ink for inkjet recording should be mobile in ink channels of a printing head. However, recently developed printing heads for inkjet printing are small and include narrow and complex channels. Therefore, bubbles may remain in a curved portion or cracks of the ink channels making it difficult for ink to easily flow through the channels. When bubbles are formed in the pathway of ink, the bubbles may flow together with ink and arrive at the printing head. In this case, ink is not easily or is not at all ejected from nozzles.

In particular, in the case of a thermal inkjet printer, when a temperature is increased, bubbles are easily formed due to gas that has been dissolved in ink. In general, ink used in a thermal inkjet printer is heated to a temperature of 25° C. to 80° C. In this temperature range, solubility of gas dissolved in ink may be decreased. Ink may be supersaturated, forming bubbles. The bubbles may clog channels and may hinder flow.

In general, a process of preparing ink is usually accompanied with dissolving of air or other gas in ink. Specifically, gas is dissolved in ink when ink is stirred, when gas diffuses through a specific component of a printing system, and when ink components react with each other.

Ink for inkjet printing may be degasified in a final ink preparation process and then contained in a vessel that has low air permeability. Alternatively, ink for inkjet printing can be filtered to a high degree to remove bubbles and then be contained in a vessel that has low air permeability. These methods described above may be effective only immediately after the gas removal process because the gas removal effect is gradually degraded over time. In particular, when the container including ink is left to sit in a high-temperature condition, gas may be generated even from the degasified ink and bubbles are formed. The bubbles may cause dots missing in the inkjet printer.

In general, bubbles in ink are formed due to gas dissolved in the ink. The amount of the gas can be reduced by removing oxygen (gas) dissolved in ink. Dissolved oxygen can be removed using a physical method or a chemical method. Examples of the physical method include a heating method or a compressing method that is performed at a reduced pressure. However, these physical methods may not be sustainable.

As an example of the chemical method, an oxygen absorber that does not affect quality of ink can be used to effectively remove dissolved oxygen. Examples of an oxygen absorber that chemically reacts with oxygen dissolved ink include Fe; sulfites, such as sodium sulfite, ammonium sulfite, or potassium sulfite; phenols such as pyrogallol; and a reducing agent, such as sodium trithionite hydrazine. To be effectively used in ink, the materials described above should be easily dissolved in ink, should not change color of ink, should not react with oxygen not to generate nitrogen gas, and should not precipitate.

JP No. 52-74406 may disclose that a decrease in a gas concentration in ink can be achieved by adding sulfite to ink so as to decrease the amount of oxygen dissolved in ink. However, sulfite is hardly dissolved in a polyhydric alcohol, which usually acts as a wetting agent in ink, and therefore, may clog an inlet of nozzles.

In addition, a hetero ring compound having an N-substituted amino group and a hydroxyl amine compound have reducing characteristics and can remove oxygen dissolved in ink. However, when these compounds are separately used, the oxygen absorption rate may be low and the amount of oxygen absorbed per unit weight may be low. Therefore, a large amount of the hetero ring compound should be used.

SUMMARY

The present composition is a mobile ink composition having good ejection characteristics during high-speed printing, in which a concentration of dissolved oxygen is low and thus, gas is not generated and bubbles are not formed even in a high-temperature condition.

A present structure also provides an ink cartridge for inkjet recording, including the ink composition.

Another present structure also provides an inkjet recording apparatus including the ink cartridge for inkjet recording.

An ink composition comprises: a colorant; a solvent; a surfactant; and an oxygen absorber, wherein the oxygen absorber comprises a hetero ring compound having an N-substituted amino group, and a hydroxylamine-based compound.

The hetero ring compound having an N-substituted amino group may include at least one material selected from the group consisting of N-aminomorpholine, 1-amino-4-methylpiperazine, N-aminohexamethyleneimine, 1-aminopyrrolidone and 1-aminopiperidine.

The hydroxylamine-based compound may be represented by Formula 1:

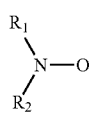

Formula 1 where $R_1$ and $R_2$ are each independently a hydrogen atom or a substituted or unsubstituted C1-C10 alkyl group.

The hydroxylamine-based compound may include at least one material selected from the group consisting of hydroxylamine, N,N-diethylhydroxylamine and N-isopropylamine.

The amount of the hetero ring compound having an N-substituted amino group may be in a range of 0.001 to 1 wt. % based on the total weight of the ink composition.

The amount of the hydroxylamine-based compound may be in a range of 0.001 to 1 wt. % based on the total weight of the ink composition.

The ratio of the hetero ring compound having an N-substituted amino group to the hydroxylamine-based compound may be in a range of 0.01 to 100.

The surfactant may include a non-ionic surfactant and the amount of the surfactant is in a range of 0.05 to 3 wt. % based on the total weight of the ink composition.

The colorant may be selected from the group consisting of a direct dye, an acidic dye, an eatable dye, an alkali dye, a reaction dye, a dispersion dye, an oily dye, and a pigment, and the amount of the colorant is in a range of 0.5 to 10 wt. % based on the total weight of the ink composition.

The solvent comprises water, or a mixed solvent comprising water and an aqueous organic solvent, and the amount of the solvent may be in a range of about 1 to 40 wt. % based on the total weight of the ink composition.

BRIEF DESCRIPTION OF THE DRAWINGS

The above and other features and advantages become more apparent by describing in detail with reference to the attached drawings in which.

DETAILED DESCRIPTION

Figure 1:
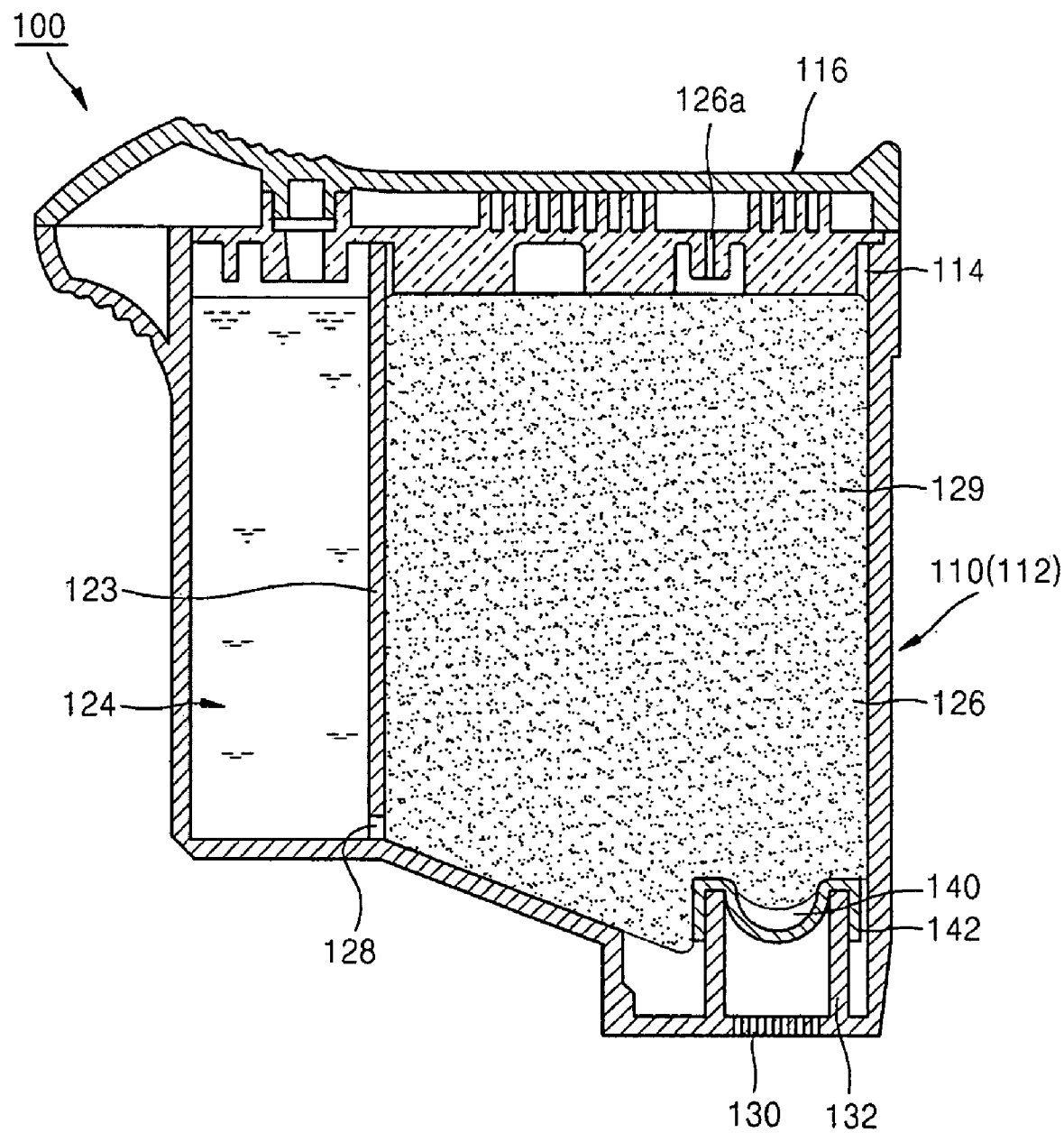
FIG. 1 is a cross-sectional view of an ink cartridge including an ink composition.

It will be appreciated that the following description is intended to refer to specific examples of structure selected for illustration in the drawings and is not intended to define or limit the disclosure, other than in the appended claims.

The present composition increases solubility of gas in an ink composition by adding an oxygen absorber. This hinders generation of gas and formation of bubbles due to dissolved gas. The oxygen absorber maintains the concentration of dissolved oxygen at a low level. Thus, even when the ink composition is in a high-temperature condition, generation of gas and formation of bubbles do not occur or occur in a much lesser amount. The oxygen absorber also increases solubility of oxygen with respect to the ink composition. Thus, the ink composition continuously flows and is stably ejected.

An ink composition herein includes a colorant; a solvent; a surfactant; and an oxygen absorber. The oxygen absorber is effective to remove all or most gas and thus, the concentration of oxygen dissolved in the ink composition can be maintained at a low level and the deoxygenated ink composition can be continuously supplied. In addition, the oxygen absorber does not react with other components and thus, the color or properties of the ink are not changed and nozzles are not clogged by the ink. The oxygen absorber may include a hetero ring compound having an N-substituted amino group and a hydroxylamine-based compound. Because the hetero ring compound having an N-substituted amino group and the hydroxylamine-based compound are preferably together, a synergistic effect occurs and an excellent oxygen absorption effect can be obtained even with a small amount of the oxygen absorber.

The hetero ring compound having an N-substituted amino group may be N-aminomorpholine represented by Formula 2, 1-amino-4-methylpiperazine represented by Formula 3, N-aminohexamethyleneimine represented by Formula 4, 1-aminopyrrolidone represented by Formula 5, or 1-aminopiperidine represented by Formula 6.

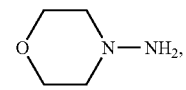

Formula 2

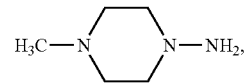

Formula 3

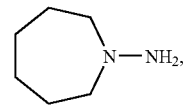

Formula 4

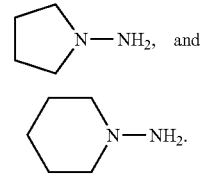

Formula 5 and

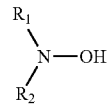

Formula 6

The hetero ring compounds having an N-substituted amino group described above may be used alone or in combination.

The hydroxylamine-based compound included in the oxygen absorber may be represented by Formula 1:

Formula 1 where $R_1$ and $R_2$ are each independently a hydrogen atom, or a substituted or unsubstituted C1-10 alkyl group.

The hydroxylamine-based compound represented by Formula 1 is not limited. For example, the hydroxylamine-based compound represented by Formula 1 may be hydroxylamine, N,N-diethylhydroxylamine, or N-isopropylamine.

In an ink composition, the amount of the hetero ring compound having an N-substituted amino group and the hydroxylamine-based compound may be in a range of 0.001 to 1 wt. %, specifically 0.001 to 0.5 wt. %, based on the total weight of the ink composition. If the amount of the combination is less than about 0.001 wt. %, an oxygen absorption effect of the ink composition may be insignificant. When the amount of the combination is greater than about 1 wt. %, viscosity of the ink composition increases and ejection performance of the ink composition may be degraded.

In the ink composition, a weight ratio (a)/(b) of the hetero ring compound having an N-substituted amino group (a) to the hydroxylamine compound (b) may be in a range of 0.01 to 100, specifically 0.1 to 10. When the weight ratio of (a) to (b) is outside the range described above, an oxygen absorption rate may be low and the amount of oxygen absorbed per unit weight may be small.

A surfactant included in the ink composition may be a cationic, anionic, or non-ionic surfactant. Use of the non-ionic surfactant is desirable due to its anti-forming properties. Examples of the non-ionic surfactant include: SURFYNOL series having an acetylenic ethoxylated diol, produced by Air Products Co.; TERGITOL series having polyethylene or polyprophylene oxide, produced by Union Carbide Co.; and Tween series having polyoxyethylene sorbitan fatty acid ester. The amount of the surfactant may be in a range of about 0.05 to 3 about wt. % based on the total weight of the ink composition. If the amount of the surfactant is outside the range described above, a sufficient anti-forming effect may not be obtained or the manufacturing costs increase.

The colorant included in the ink composition may be dye, or pigment such as an inorganic pigment or an organic pigment. The dye may be a direct dye, an acidic dye, an eatable dye, an alkali dye, a reaction dye, a dispersion dye, or an oily dye. Specifically, the dye may be azo dye, anthraquinone dye, indigo dye, phthalocyanine dye, carbonyl dye, quinone imine dye, metine dye, quinoline dye, or nitro dye. The inorganic pigment may be titan oxide, Bengala, antimony red, cadmium red, cadmium yellow, cobalt blue, carbon black, or graphite. The organic pigment may be an azo pigment. The amount of the colorant may be determined according to the type of a solvent used or characteristics required of ink. For example, the amount of the colorant may be in a range of 0.5 to 10 wt. %, specifically 1 to 7 wt. %, based on the total weight of the ink composition. If the amount of the colorant is less than about 0.5 wt. %, a sufficient coloring effect cannot be obtained. On the other hand, if the amount of the colorant is greater than about 10 wt. %, the manufacturing costs are increased due to excess colorant.

The solvent included in the ink composition, functioning as a dispersing medium, may include water. The water may be deionized water, but is not limited thereto. The amount of water may be in a range of 10 to 98 wt. %, specifically 40 to 95 wt. %, based on the total weight of the ink composition. When the amount of water is less than about 10 wt. % based on the total weight of the ink composition, viscosity of the ink composition may be increased and the ejection performance of the ink composition may be degraded. On the other hand, when the amount of water is greater than about 98 wt. % based on the total weight of the ink composition, the surface tension of the ink composition may be too high and thus, permeability of the ink composition with respect to a printing medium such as a normal sheet or a special sheet, a dot forming ability of the ink composition, and dry characteristics of printed images may be degraded.

The solvent included in the ink composition functioning as a dispersing medium, may further include an aqueous organic solvent. The amount of the aqueous organic solvent may be in a range of 1 to 40 wt. % based on the total weight of the ink composition. If the amount of the aqueous organic solvent is less than about 1 wt. % based on the total weight of the ink composition, the surface tension of the ink composition may be too high and thus, permeability of the ink composition with respect to a printing medium such as a normal sheet or a special sheet, a dot forming ability of the ink composition, and dry characteristics of printed images may be degraded. On the other hand, if the amount of the aqueous organic solvent is greater than about 40 wt. %, viscosity of the ink composition may be too high and ejection performance of the ink composition may be degraded.

Examples of the aqueous organic solvent include an aliphatic mono-valent alcohol, an aliphatic polyhydric alcohol, and an aliphatic polyhydric alcohol derivative. When the solvent included in the ink composition includes water and the aqueous organic solvent, the weight ratio of water to the aqueous organic solvent may be in a range of 1:0.02 to 1. When the weight ratio of water to the aqueous organic solvent is less than about 1:0.02, the surface tension of the ink composition is too high and thus, permeability of the ink composition with respect to a printing medium, a dot forming ability of the ink composition, and dry characteristics of printed images may be degraded. On the other hand, when the weight ratio of water to the aqueous organic solvent is greater than about 1, the viscosity of the ink composition is too high, and ejection performance of the ink composition may be degraded.

The aliphatic mono-valent alcohol controls the surface tension of the ink composition and permeability of the ink composition with respect to a printing medium, a dot forming ability of the ink composition, and a dry performance of printed images can be improved. In addition, the aliphatic polyhydric alcohol and the aliphatic polyhydric alcohol derivative may not easily evaporate and may lower the freezing point of the ink composition, and thus, storage stability of the ink composition at low temperature may be improved and nozzle clogging may not occur.

The aliphatic mono-valent alcohol may be a C1 to C10 low alcohol, such as methyl alcohol, ethyl alcohol, n-propyl alcohol, i-propyl alcohol, n-butyl alcohol, s-butyl alcohol, or t-butyl alcohol. Specifically, the aliphatic mono-valent alcohol may be ethyl alcohol, i-propyl alcohol or n-butyl alcohol.

Examples of the aliphatic polyhydric alcohol include alkyleneglycols, such as ethyleneglycol, diethyleneglycol, triethyleneglycol, propyleneglycol, butyleneglycol, and glycerol; polyalkyleneglycols, such as polyethyleneglycol and polyprophyleneglycol; thiodiglycols; and mixtures thereof.

The aliphatic polyhydric alcohol derivative may be a low alkylether of the aliphatic polyhydric alcohol or a low carboxylicester of the aliphatic polyhydric alcohol. Specifically, the low alkylether of the aliphatic polyhydric alcohol may be ethyleneglycoldimethylether, and the low carboxylicester of the aliphatic polyhydric alcohol may be ethyleneglycoldiacetate.

The ink composition may further include an additive that is commonly used to prepare an ink composition in the art. The additive may be a dispersing agent, a viscosity controller, a pH controller, an antiseptic substance, or a chelating agent.

Use of the ink composition is not limited. The ink composition can be used in an ink cartridge for inkjet printing, a toner composition, a paint composition, or a coating solution. Specifically, the ink composition can be used in an ink cartridge of an inkjet printer including an array head. Unlike a shuttle-type inkjet printer that can print using a single chip, an inkjet printer including an array head can print using a plurality of chips at high speed and the process amount can be increased. In particular, an inkjet printer including an array head can efficiently print images using the ink composition.

Also provided is an ink cartridge for inkjet recording including the ink composition described above. The ink cartridge for inkjet recording will be described with reference to FIG. 1.

FIG. 1 is a cross-sectional view of an ink cartridge 100 including an ink composition. An ink cartridge 100 includes an ink cartridge main body 110 including an ink storage tank 112, an inner cover 114 covering a top portion of the ink storage tank 112, and an outer cover 116 that is separated from the inner cover 114 by a predetermined gap and seals the ink storage tank 112 and the inner cover 114.

The ink storage tank 112 is divided into a first chamber 124 and a second chamber 126 by a vertical barrier wall 123. An ink passage 128 between the first chamber 124 and the second chamber 126 is formed in a bottom portion of the vertical barrier wall 123. The first chamber 124 is filled with ink, and the second chamber 126 is filled with a sponge and ink. A vent hole 126a corresponding to the second chamber 126 is formed in the inner cover 114. A filter 140 is disposed in a lower portion of the second chamber 126, so that ink impurities and fine bubbles are filtered to prevent nozzles 130 of a printer head at the bottom of the ink cartridge 100 from being clogged. A hook 142 is disposed at an edge of the filter 140 and is coupled to a top portion of a standpipe 132. An ink composition as described herein is stored in the first chamber 124 and the second chamber 126, and when an inkjet recording apparatus including the inkjet cartridge 100 including the ink composition operates, the ink composition passes through the filter 140 and the nozzles 130 of the printer head and then are ejected from the ink storage tank 112 onto a printing medium in a liquid-drop form.

Figure 2:
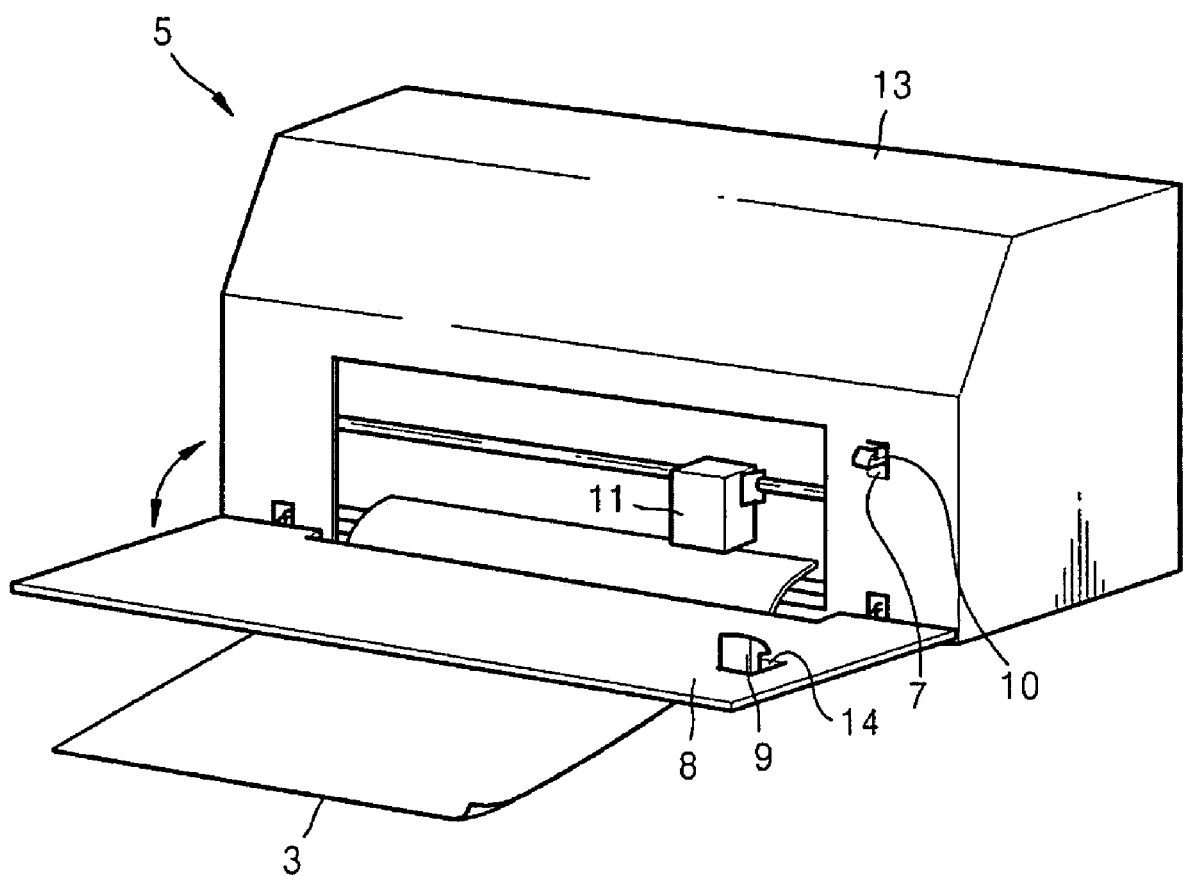
FIG. 2 is a perspective view of an inkjet recording apparatus including an ink cartridge including an ink composition.

Also provided is an inkjet recording apparatus including the ink cartridge for inkjet recording. Hereinafter, the inkjet recording apparatus will be described with reference to FIG. 2. The inkjet recording apparatus 5 includes the ink cartridge 11 for inkjet printing including the ink composition, wherein the ink composition includes an oxygen absorber, a surfactant, a colorant, and a solvent. A printer cover 8 is hinged to a main body 13 of the inkjet recording apparatus 5. A coupling portion of a movable latch 10 protrudes through a hole 7 in the main body 13. The movable latch 10 is coupled to a fixed latch 9 that is coupled to an inner side of the printer cover 8 when the printer cover 8 is closed. The printer cover 8 has a recess 14 in a region corresponding to the coupling portion of the movable latch 10 protruding through the hole 7. The ink cartridge 11 is positioned such that ink can be ejected onto paper 3 that passes under the ink cartridge 11.

As described above, the ink composition includes an oxygen absorber and hinders formation of bubbles in an ink channel. Therefore, the ink composition can be stably ejected.

A more detailed description with reference to examples is below. These examples are for illustrative purposes only and are not intended to limit the scope described herein.

Ink compositions were prepared by completely mixing components shown in Examples 1-5, and the sum of all the components in each ink composition was 100 parts by weight.

EXAMPLE 1

| | |
|---|---|
| C.I. Basic Black 2 | 5 parts by weight |
| Glycerol | 2 parts by weight |
| Diethyleneglycol | 3 parts by weight |
| Non-ionic surfactant | 0.5 parts by weight |
| (Product Name: Surfynol 440, Air Products Co.) | |
| N-aminomorpholine | 0.02 parts by weight |
| hydroxylamine | 0.03 parts by weight |
| Water (deionized water) | the balance |

EXAMPLE 2

| | |
|---|---|
| C.I. Direct Yellow 44 | 3 parts by weight |
| Glycerol | 3 parts by weight |
| Diethyleneglycol | 2 parts by weight |
| Ethyleneglycol | 2 parts by weight |
| Non-ionic surfactant | 0.4 parts by weight |
| (Product Name: Tween 20, Aldrich Co.) | |
| 1-amino-4-methylpiperazine | 0.03 parts by weight |
| N,N-diethylhydroxylamine | 0.04 parts by weight |
| Water (deionized water) | the balance |

EXAMPLE 3

| | |
|---|---|
| C.I. Basic Blue 26 | 2 parts by weight |
| Diethyleneglycol | 3 parts by weight |
| Ethyleneglycol | 4 parts by weight |
| Non-ionic surfactant | 0.3 parts by weight |
| (Product Name: Surfynol 465, Air Products Co.) | |
| N-aminohexamethyleneimine | 0.05 parts by weight |
| N-isopropylamine | 0.05 parts by weight |
| Water (deionized water) | the balance |

EXAMPLE 4

| | |
|---|---|
| C.I. Direct Red 227 | 3 parts by weight |
| Glycerol | 3 parts by weight |
| Diethyleneglycol | 2 parts by weight |
| Dthyleneglycol | 4 parts by weight |
| Non-ionic surfactant | 0.6 parts by weight |
| (Product Name: Tween 40, Aldrich Co.) | |
| 1-aminopyrrolidine | 0.07 parts by weight |
| N,N-diethylhydroxylamine | 0.04 parts by weight |
| Water (deionized water) | the balance |

EXAMPLE 5

| | |
|---|---|
| Carbon Black | 6 parts by weight |
| (Product Name: FW 200, Degussa Co.) | |
| Acrylate dispersing agent | 5 parts by weight |
| (Product Name: Joncryl 61, Johnson Polymer Co.) | |
| Glycerol | 3 parts by weight |
| Diethyleneglycol | 4 parts by weight |
| Ethyleneglycol | 4 parts by weight |
| Non-ionic surfactant | 0.3 parts by weight |
| (Product Name: Tergitol NP-30, Union Carbide Co.) | |
| 1-aminopiperidine | 0.005 parts by weight |
| N,N-diethylhydroxylamine | 0.009 parts by weight |
| Water (deionized water) | the balance |

COMPARATIVE EXAMPLE

Ink compositions were prepared by completely mixing components shown in Comparative Examples 1-5, and the sum of the components in each ink composition was 100 parts by weight.

COMPARATIVE EXAMPLE 1

| | |
|---|---|
| C.I. Basic Black 2 | 5 parts by weight |
| Glycerol | 2 parts by weight |
| Diethyleneglycol | 3 parts by weight |
| Non-ionic surfactant | 0.5 parts by weight |
| (Product Name: Surfynol 440, Air Products Co.) | |
| Water (deionized water) | the balance |

COMPARATIVE EXAMPLE 2

| | |
|---|---|
| C.I. Direct Yellow 44 | 3 parts by weight |
| Glycerol | 3 parts by weight |
| Diethyleneglycol | 2 parts by weight |
| Ethyleneglycol | 2 parts by weight |
| Non-ionic surfactant | 0.4 parts by weight |
| (Product Name: Tween 20, Aldrich Co.) | |
| 1-amino-4-methylpiperazine | 0.07 parts by weight |
| Water (deionized water) | the balance |

COMPARATIVE EXAMPLE 3

| | |
|---|---|
| C.I. Basic Blue 26 | 2 parts by weight |
| Diethyleneglycol | 3 parts by weight |
| Ethyleneglycol | 4 parts by weight |
| Non-ionic surfactant | 0.3 parts by weight |
| (Product Name: Surfynol 465, Air Products Co.) | |
| N-isopropylamine | 0.1 parts by weight |
| Water (deionized water) | the balance |

COMPARATIVE EXAMPLE 4

| | |
|---|---|
| C.I. Direct Red 227 | 3 parts by weight |
| Glycerol | 3 parts by weight |
| Diethyleneglycol | 2 parts by weight |
| Ethyleneglycol | 4 parts by weight |
| Non-ionic surfactant | 0.6 parts by weight |
| (Product Name: Tween 40, Aldrich Co.) | |
| 1-Aminopyrrolidine | 0.11 parts by weight |
| Water (deionized water) | the balance |

COMPARATIVE EXAMPLE 5

| | |
|---|---|
| Carbon Black | 6 parts by weight |
| (Product Name: FW 200, Degussa Co.) | |
| Acrylate dispersing agent | 5 parts by weight |
| (Product Name: Joncryl 61, Johnson Polymer Co.) | |
| Glycerol | 3 parts by weight |
| Diethyleneglycol | 4 parts by weight |
| Ethyleneglycol | 4 parts by weight |
| Non-ionic surfactant | 0.3 parts by weight |
| (Product Name: Tergitol NP-30, Union Carbide Co.) | |
| N,N-diethylhydroxylamine | 0.014 parts by weight |
| Water (deionized water) | the balance |

Evaluations

Concentration of Oxygen in Ink Composition

A concentration of oxygen dissolved in the ink compositions prepared according to Examples 1-5 and Comparative Examples 1-5 was measured using a dissolved oxygen meter. The results are shown in Table 1:

TABLE 1

| | Concentration of oxygen dissolved in ink composition (mg/L) |
|---|---|
| Example 1 | 0.8 |
| Example 2 | 1.1 |
| Example 3 | 1.3 |
| Example 4 | 2.2 |
| Example 5 | 1.0 |
| Comparative Example 1 | 7.3 |
| Comparative Example 2 | 7.2 |
| Comparative Example 3 | 7.1 |
| Comparative Example 4 | 7.5 |
| Comparative Example 5 | 7.9 |

As shown in Table 1, the concentration of oxygen dissolved in the ink compositions prepared according to Examples 1-5 was much lower than the concentration of oxygen dissolved in the ink compositions prepared according to Comparative Examples 1-5.

In addition, when the ink compositions prepared according to Examples 1-5 were used for inkjet printing, the number of missing dots was less than when the ink composition was prepared according to Comparative Example 1. In comparative Example 1, an oxygen absorber was not used. The number of missing dots in ink compositions prepared according to Examples 1-5 was less than when the ink compositions were prepared according to Comparative Examples 2 to 5, in which when a hetero ring compound having an N-substituted amino group or a hydroxylamine compound was used alone. Therefore, it can be seen that when a hetero ring compound having an N-substituted amino group and a hydroxylamine compound are used at the same time, a synergy effect occurs and an oxygen absorption rate is increased. Accordingly, the oxygen absorber-containing ink composition described, can be stably ejected even when a printing process is performed at high speed.

An ink composition includes a hetero ring compound having an N-substituted amino group and a hydroxylamine-based compound as an oxygen absorber and a concentration of oxygen dissolved in the ink composition can be maintained at a low level. Therefore, even when the ink composition is in a high temperature condition, gas is not generated and bubbles are not formed and thus, the ink composition moves smoothly and can be stably ejected.

It will be understood by those ordinary skilled in the art that various changes in form and details may be made therein without departing from the spirit and scope as defined by the following claims.

What is claimed is:

1. An ink composition comprising:
   a colorant;
   a solvent;
   a surfactant;
   a hetero ring compound having an N-substituted amino group; and
   a hydroxylamine-based compound.

2. The ink composition of claim 1, wherein the hetero ring compound having an N-substituted amino group comprises at least one material selected from the group consisting of N-aminomorpholine, 1-amino-4-methylpiperazine, N-aminohexamethyleneimine, 1-aminopyrrolidone and 1-aminopiperidine.

3. The ink composition of claim 1, wherein the hydroxylamine-based compound is represented by Formula 1:

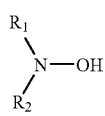

Formula 1 where $R_1$ and $R_2$ are each independently a hydrogen atom or a substituted or unsubstituted C1-C10 alkyl group.

4. The ink composition of claim 1, wherein the hydroxylamine-based compound comprises at least one material selected from the group consisting of hydroxylamine, N,N-diethylhydroxylamine and N-isopropylamine.

5. The ink composition of claim 1, wherein the amount of the hetero ring compound having an N-substituted amino group is in a range of about 0.001 to about 1 wt. % based on the total weight of the ink composition.

6. The ink composition of claim 1, wherein the amount of the hydroxylamine-based compound is in a range of about 0.001 to about 1 wt. % based on the total weight of the ink composition.

7. The ink composition of claim 1, wherein a ratio of the hetero ring compound having an N-substituted amino group to the hydroxylamine-based compound is in a range of about 0.01 to about 100.

8. The ink composition of claim 1, wherein the surfactant is a non-ionic surfactant and in a range of about 0.05 to about 3 wt. % based on the total weight of the ink composition.

9. The ink composition of claim 1, wherein the colorant is selected from the group consisting of a direct dye, an acidic dye, an eatable dye, an alkali dye, a reaction dye, a dispersion dye, an oily dye, and a pigment; and the amount of the colorant is in a range of about 0.5 to about 10 wt. % based on the total weight of the ink composition.

10. The ink composition of claim 1, wherein the solvent comprises water and the amount of the solvent is in a range of about 40 to about 98 wt. % based on the total weight of the ink composition.

11. The ink composition of claim 1, wherein the hetero ring compound and the hydroxylamine-based compound comprise an oxygen absorber and the concentration of oxygen dissolved in the ink composition is less than about 2.2 mg/L.

12. The ink composition of claim 8, wherein the surfactant comprises an acetylenic ethoxylated diol, polyethylene or polyprophylene oxide and polyoxyethylene sorbitan fatty acid ester.

13. The ink composition of claim 10, further comprising an aqueous organic solvent in a range of about 1 to about 40 wt. %.

14. The ink composition of claim 13, wherein the aqueous organic solvent is selected from the group consisting of: an aliphatic mono-valent alcohol, an aliphatic polyhydric alcohol and an aliphatic polyhydric alcohol derivative.

15. An ink cartridge for inkjet recording, comprising the ink composition of claim 1.

16. An inkjet recording apparatus comprising the ink cartridge of claim 15.

17. An ink composition comprising:
   a solvent comprising water and an aqueous organic solvent;
   a hetero ring compound having an N-substituted amino group; and
   a hydroxylamine-based compound.

18. The ink composition of claim 17, further comprising a non-ionic surfactant.

* * * * *

UNITED STATES PATENT AND TRADEMARK OFFICE
CERTIFICATE OF CORRECTION

PATENT NO. : 7,938,898 B2
APPLICATION NO. : 12/260458
DATED : May 10, 2011
INVENTOR(S) : Ham et al.

It is certified that error appears in the above-identified patent and that said Letters Patent is hereby corrected as shown below:

Column 12, Line 20, In Claim 12, delete "polyprophylene" and insert -- polypropylene --, therefor.

Signed and Sealed this
Twenty-ninth Day of May, 2012

David J. Kappos
*Director of the United States Patent and Trademark Office*